Jan. 12, 1954     C. H. SCHETZER     2,665,921
SHOE SCRAPER FOR AUTOMOTIVE VEHICLES
Filed Oct. 24, 1952
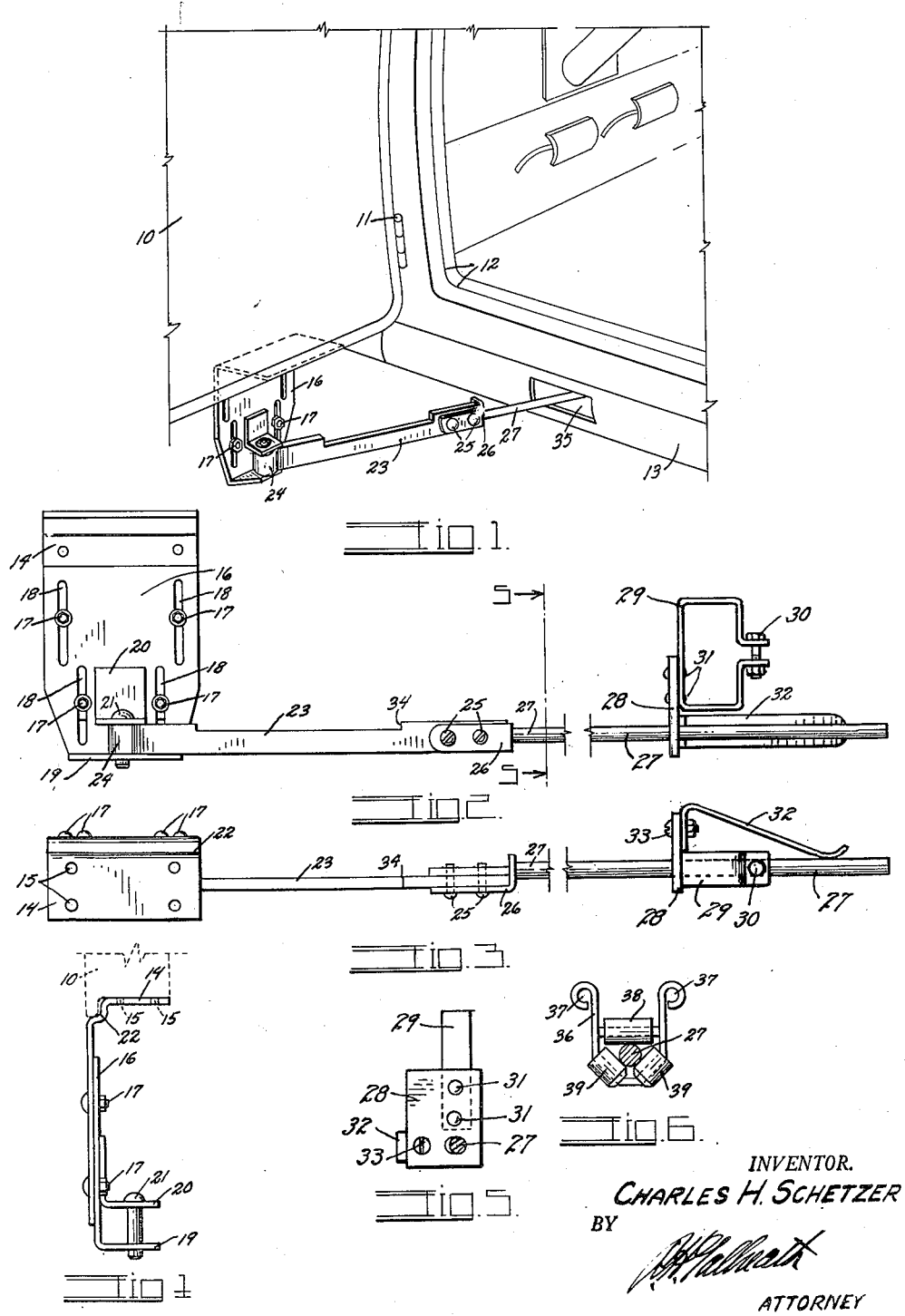
INVENTOR.
CHARLES H. SCHETZER
BY
ATTORNEY Patented Jan. 12, 1954

2,665,921

UNITED STATES PATENT OFFICE 2,665,921

SHOE SCRAPER FOR AUTOMOTIVE VEHICLES

Charles H. Schetzer, Goodland, Kans.

Application October 24, 1952, Serial No. 316,628

7 Claims. (Cl. 280—164)

This invention relates to a boot and shoe scraper for automotive vehicles. During inclement weather, mud, snow, sand, etc. are continually tracked into an automobile by the driver thereof. The principal object of this invention is to provide a scraper which will automatically come into usable position when the driver's door is opened so that he may scrape his boots or shoes each time before entering the car, if necessary.

Other objects of the invention are to so construct the device that it will be entirely concealed when the door is closed; so that it will be adjustable for installation on various makes of cars; and so that it will not rattle or vibrate while the car is in use.

A further object is to so construct the device that the improved scraper can be quickly and easily removed without the use of tools so that it may be conveniently carried beneath the seat during the summer season or other times when it is not needed.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view, illustrating the improved scraper as it would appear installed and in the "ready to use" position;

Fig. 2 is a side view of the improved boot and shoe scraper;

Fig. 3 is a top view thereof;

Fig. 4 is an end view of a door bracket employed with the scraper;

Fig. 5 is a vertical section, taken on the line 5—5, Fig. 2; and

Fig. 6 is a detail view of an alternate form of a bracket which may be used with the improved scraper.

In the drawing, conventional parts of a typical motor vehicle are indicated by numeral as follows: door 10, door hinges 11, door frame 12, and chassis skirt 13.

The improved automotive boot and shoe scraper is installed by securing an upper door bracket member 14 to the bottom of the door 10 by means of suitable attachment screws which pass through screw holes 15 in the upper bracket member 14. The upper bracket member is contoured, as shown at 22, to conform to the shape of the door bottom and vertically align with the outer surface of the door.

A lower L-shaped bracket plate 16 is secured on the inner face of the upper bracket member 14 by means of suitable attachment bolts 17 passing through vertically slotted openings 18 in the plate 16. The lower extremity of the lower plate 16 is turned horizontally at right angles to the plane of the plate to form an inwardly-extending supporting shelf 19. An angle clip 20 is welded or otherwise secured to the plate 16 in vertically-spaced, parallel relation with the shelf 19, and a removable hinge pin 21 extends vertically through the members 19 and 20.

The above-described elements comprise the door bracket portion of the invention. The scraper portion of the device comprises an elongated scraper bar 23 provided at its outer extremity with a cylindrical sleeve 24 for hingedly receiving the pin 21. The inner extremity of the bar 23 is perforated for the passage of two cap screws 25 which pass through an L-shaped terminal clip 26 and are threaded into a flattened outer extremity formed on a scraper rod 27. The rod 27 passes through a snug receiving opening in the clip 26 so that it is held in rigid alignment with the scraper bar 23. The mid-portion of the scraper bar 23 is indented, as illustrated, to provide vertical side edges 34 against which the edges of a shoe sole may be rubbed to remove debris therefrom.

The scraper rod 27 is slidably mounted in a non-metallic slide block 28 formed of pressed fiber or similar non-metallic material so as to prevent metal-to-metal contact. The block 28 may be secured to the chassis frame of the automotive vehicle in any desired manner. One method of securing the block employs a flexible, metallic strap 29 which can be passed around the left longitudinal frame member of the automotive chassis and clamped thereabout by means of a suitable clamp bolt 30. The fiber block 28 is secured to the metal strap 29 by means of rivets 31, or in any other desired manner.

An anti-rattle spring 32 is mounted on the rear of the block 28 by means of a suitable attachment bolt 33. The spring 32 comprises an elongated leaf of resilient metal bent to bear against the rod 27 to prevent the rod from vibrating or rattling in the block 28.

It can be seen that, when the door 10 is opened, the rod 27 will be drawn outwardly through its slide block 28 so that the scraper bar 23 will extend diagonally from the door 10 to a point beneath the door frame 12, where it will be easily accessible for scraping purposes. When the door is closed, the rod 27 will be forced inwardly through the slide block 28 so that the scraper bar 23 will be entirely concealed beneath the floor of the car.

In some installations an opening 35 may be cut in the chassis skirt 13 for the passing of the bar 23 and the rod 27. This opening will be completely covered by the door brackets 14—16 when the door is closed. In other installations the rod 27 and the scraper will pass beneath the chassis without any necessity for the opening 35.

It is desired to call attention to the fact that the slotted openings 18 for the bolts 17 allow the vertical length of the door bracket to be accurately adjusted to level the scraper bar and align it with the slide block on any given installation.

In Fig. 6, an alternate bracket for supporting the rod 27 is illustrated. The alternate bracket comprises an inverted, A-shaped frame member 36 formed from heavy wire or rod, terminating at its top in two screw-receiving loops 37 by means of which it may be secured to a chassis member of the vehicle so as to project downwardly therebelow.

An upper roller 38 is mounted on the crossmember of the A-frame and rides on top of the rod 27. Two diagonal rubber rollers 39 are rotatably mounted in the diagonal portions of the A-frame and roll against the two roller sides of the rod 27 to resiliently and movably support the rod without looseness and rattling.

It has been found advisable to hang some type of flexible mud skirt from the chassis ahead of the scraper installation to prevent snow and mud from freezing thereon.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A boot and shoe scraper for an automotive vehicle comprising: a bracket member adapted to be secured to the bottom of a door of said vehicle; a supporting member adapted to be secured beneath the floor of said vehicle; and a scraper element hinged to said bracket member and slidably supported in said supporting member.

2. A boot and shoe scraper for an automotive vehicle as described in claim 1 in which the scraper element consists of a scraper bar hinged at one extremity to said bracket member; and a slide rod secured to the other extremity of said scraper bar and extending in alignment with the latter and slidably through said supporting element.

3. A boot and shoe scraper for an automotive vehicle as described in claim 2 having a resilient device slidably engaging said slide rod to retard vibration of the latter.

4. A boot and shoe scraper for an automotive vehicle as described in claim 3 in which said bracket member comprises: an upper bracket member; means for attaching said upper bracket member to said door; a lower bracket member to which said scraper bar is hinged; and attachment members securing said two bracket members together and allowing relative vertical adjustment therebetween.

5. A boot and shoe scraper comprising: a door bracket; means for securing said door bracket to the bottom of the door of an automotive vehicle; a removable, vertical hinge pin carried by said door bracket; a scraper element hinged at its one extremity to said hinge pin; a supporting member; and means for securing said supporting member to said automotive vehicle in alignment with said door bracket, the other extremity of said scraper element being supported in said supporting member and being movable longitudinally in the latter.

6. A boot and shoe scraper as described in claim 5 in which the supporting member comprises a slide block of non-metallic material having an opening for slidably receiving said scraper element.

7. A boot and shoe scraper as described in claim 6 and having a resilient leaf spring mounted on said supporting member and positioned to engage said scraper element to resist vibration of the latter.

CHARLES H. SCHETZER.

References Cited in the file of this patent
UNITED STATES PATENTS

| Number | Name | Date |
|---|---|---|
| 439,296 | Gosling | Oct. 28, 1890 |
| 1,227,218 | Terry | May 22, 1917 |
| 2,258,177 | Edwards | Oct. 7, 1941 |
| 2,557,229 | Lyster | June 19, 1951 |